US012659118B2

(12) United States Patent
Liu

(10) Patent No.: US 12,659,118 B2
(45) Date of Patent: Jun. 16, 2026

(54) DETERMINATION METHOD AND APPARATUS FOR SSB POSITIONS AND COMMUNICATION DEVICE

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 461 days.

(21) Appl. No.: 18/265,169

(22) PCT Filed: Dec. 3, 2020

(86) PCT No.: PCT/CN2020/133661
§ 371 (c)(1),
(2) Date: Jun. 2, 2023

(87) PCT Pub. No.: WO2022/116098
PCT Pub. Date: Jun. 9, 2022

(65) Prior Publication Data
US 2024/0031104 A1 Jan. 25, 2024

(51) Int. Cl.
*H04L 5/00* (2006.01)
*H04W 16/14* (2009.01)
*H04W 72/1268* (2023.01)

(52) U.S. Cl.
CPC .......... *H04L 5/0053* (2013.01); *H04L 5/0007* (2013.01); *H04L 5/0046* (2013.01);
(Continued)

(58) Field of Classification Search
CPC ... H04L 5/0053; H04L 5/0007; H04L 5/0046; H04L 5/008; H04L 5/0048; H04W 16/14; H04W 72/1268
See application file for complete search history.

(56) References Cited

U.S. PATENT DOCUMENTS

2018/0324678 A1 11/2018 Chen et al.
2020/0154376 A1* 5/2020 Ko ........................ H04W 72/30
(Continued)

FOREIGN PATENT DOCUMENTS

CN 110035510 A 7/2019
CN 110149294 A 8/2019
(Continued)

OTHER PUBLICATIONS

CATT, "System Analysis of NR operation in 52.6 GHz to 71 GHz", 3GPP TSG RAN WG1 #103-e,R1-2007847, Oct. 26-Nov. 13, 2020.
(Continued)

*Primary Examiner* — Steven Hieu D Nguyen
(74) *Attorney, Agent, or Firm* — Volpe Koenig

(57) ABSTRACT

A method, device and computer readable medium for determining an Synchronization Signal Block (SSB) position. The SSB position is determined by determining an actual transmission position of a target SSB according to various SSB positions being set in a radio frame; and sending indication information of the actual transmission position to a terminal device, wherein the various SSB positions being set in the radio frame are spaced from each other by at least one OFDM symbol, and at least one slot in the radio frame comprises two SSB positions.

18 Claims, 5 Drawing Sheets

(52) U.S. Cl.
CPC ............. *H04L 5/008* (2013.01); *H04W 16/14* (2013.01); *H04W 72/1268* (2013.01)

(56) References Cited

U.S. PATENT DOCUMENTS

| | | | | |
|---|---|---|---|---|
| 2020/0162981 | A1* | 5/2020 | Jain | H04W 36/302 |
| 2020/0178188 | A1* | 6/2020 | Zhao | H04L 5/0051 |
| 2020/0196306 | A1* | 6/2020 | Si | H04W 72/23 |
| 2020/0209910 | A1* | 7/2020 | Zou | H03L 7/0891 |
| 2020/0280940 | A1* | 9/2020 | Kim | H04J 11/0086 |
| 2021/0127355 | A1* | 4/2021 | Gonzalez | H04W 68/02 |
| 2021/0320833 | A1* | 10/2021 | Kim | H04J 11/0073 |
| 2021/0345340 | A1* | 11/2021 | Ma | H04L 5/0053 |
| 2022/0150849 | A1* | 5/2022 | Zhao | H04L 27/2626 |
| 2022/0232493 | A1* | 7/2022 | Harada | H04J 11/0076 |
| 2024/0049289 | A1* | 2/2024 | Ko | H04W 74/004 |

FOREIGN PATENT DOCUMENTS

| | | | |
|---|---|---|---|
| CN | 110460411 | A | 11/2019 |
| CN | 110474744 | A | 11/2019 |
| CN | 110601809 | A | 12/2019 |
| CN | 110611948 | A | 12/2019 |
| CN | 110691408 | A | 1/2020 |
| CN | 110859060 | A | 3/2020 |
| CN | 110895657 | A | 3/2020 |
| CN | 110972252 | A | 4/2020 |
| CN | 111147213 | A | 5/2020 |
| CN | 111181702 | A | 5/2020 |
| CN | 111669238 | A | 9/2020 |
| KR | 20190080786 | A | 7/2019 |
| WO | 2019016987 | A1 | 1/2019 |
| WO | 2020/125424 | A1 | 6/2020 |
| WO | 2020146850 | A1 | 7/2020 |

OTHER PUBLICATIONS

Moderator Qualcomm Incorporated. "FL summary for initial access signals and channels for NR-U R1-2006993" 3GPP TSG RAN WGI Meeting #102-e, Aug. 24, 2020 (Aug. 24, 2020) entire document; Type-A.

* cited by examiner

Determine an actual transmission position of a target SSB according to various set SSB positions in a radio frame ⌐101

Send indication information of the actual transmission position to a terminal device ⌐102

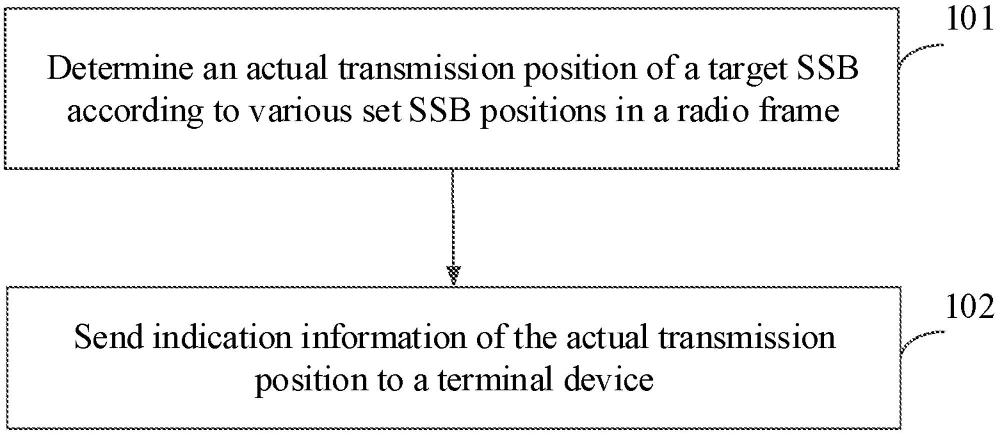

FIG. 1

Determine OFDM symbol index values, relative to a starting point of a radio frame, of the various SSB positions in the radio frame according to the used sub-carrier space ⌐201

Determine the actual transmission position of the target SSB according to OFDM symbol index values, relative to the starting point of the radio frame, of the various SSB positions in the radio frame ⌐202

Send indication information of the actual transmission position to a terminal device ⌐203

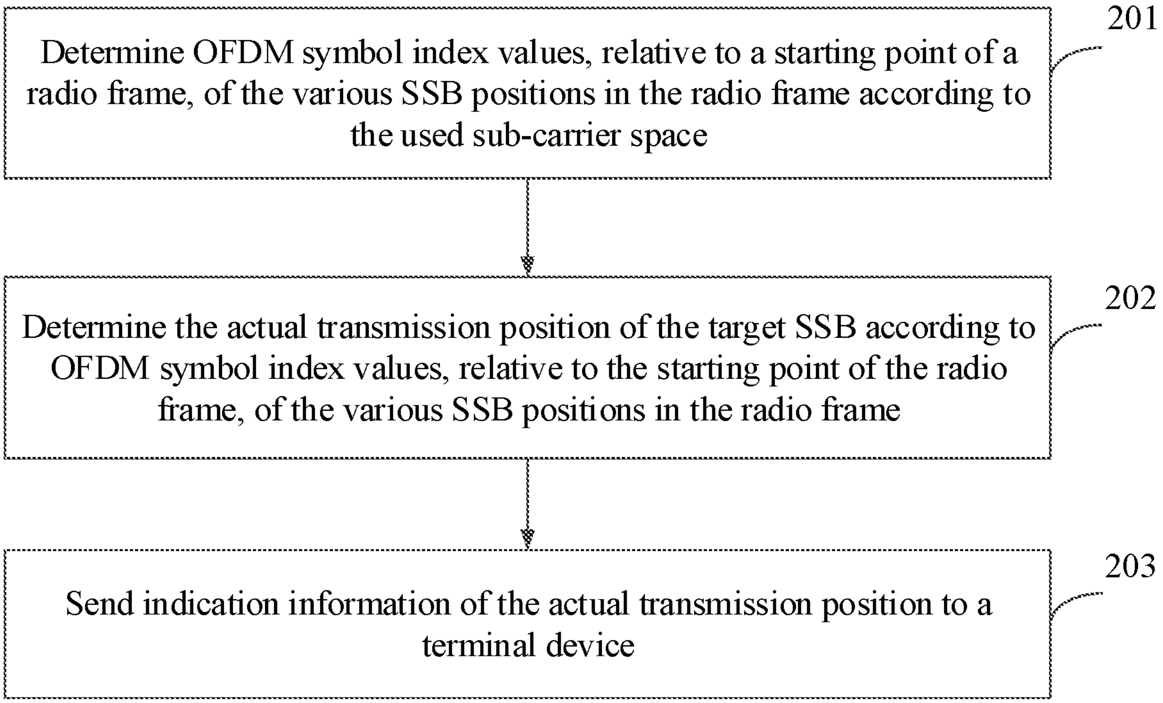

FIG. 2

Determine an actual transmission position of a target SSB according to the position indication information sent by the network device and the various set SSB positions in the radio frame, which the various set SSB positions in the radio frame are spaced from each other by at least one OFDM symbol, and at least one slot in the radio frame includes two SSB positions

301

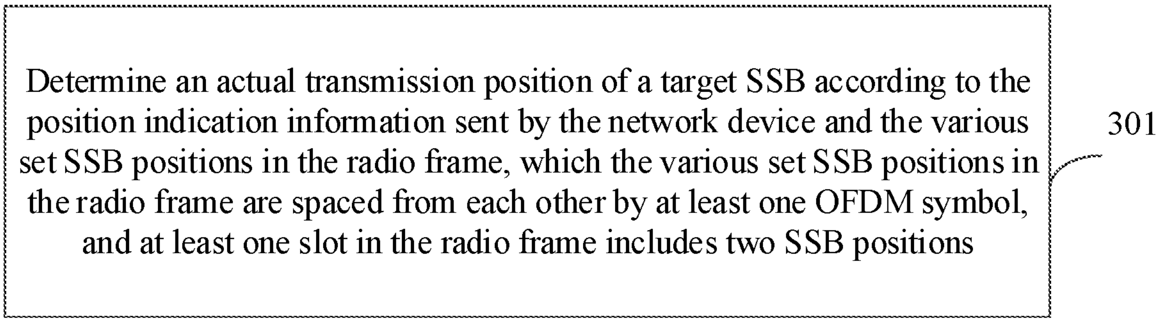

FIG. 3

Determine OFDM symbol index values, relative to a starting point of a radio frame, of the various SSB positions in the half radio frame according to a sub-carrier space of a target SSB

401

Determine the actual transmission position of the target SSB according to OFDM symbol index values, relative to a starting point of the radio frame, of the various SSB positions in the radio frame and position indication information sent by the network device

402

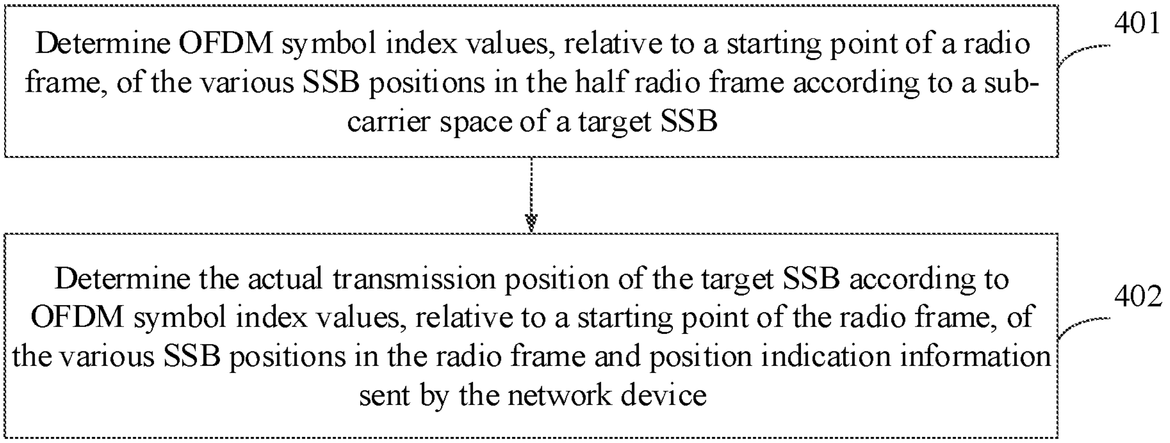

FIG. 4

DETERMINATION METHOD AND APPARATUS FOR SSB POSITIONS AND COMMUNICATION DEVICE

CROSS REFERENCE TO RELATED APPLICATION

The present application is a U.S. National Stage of International Application No. PCT/CN2020/133661, filed on Dec. 3, 2020, the contents of all of which are incorporated herein by reference in their entirety for all purposes.

BACKGROUND

In the New Radio (NR) communication system, an orthogonal frequency division multiplexing (OFDM) symbol index value, relative to a starting point of a half radio frame, of a candidate position of a synchronization signal and PBCH block (SSB) in an SSB half radio frame in several scenarios is specified in the NR standard.

In some cases, a terminal device may determine the position of each SSB in the half radio frame according to a detected SSB time index and the position, complying with the NR standard, of each SSB in the half radio frame.

SUMMARY

The present disclosure relates to the technical field of radio communications, and in particular to a determination method and apparatus for an SSB position and a communication device.

An embodiment in a first aspect of the present disclosure provides a determination method for an SRS position, the determination method performed by a network device, the method including:

- determining an actual transmission position of a target SSB according to various SSB positions being set in a radio frame; and
- sending indication information of the actual transmission position to a terminal device,
- which the various SSB positions being set in the radio frame are spaced from each other by at least one OFDM symbol, and at least one slot in the radio frame includes two SSB positions.

An embodiment in a second aspect of the present disclosure provides a determination method for an SRS position, the determination method performed by a terminal device, the method including:

- determining an actual transmission position of an actually transmitted target SSB in the radio frame according to position indication information sent by the network device and various SSB positions being set in a radio frame,
- which the various SSB positions being set in the radio frame are spaced from each other by at least one OFDM symbol, and at least one slot in the radio frame includes two SSB positions.

An embodiment in a third aspect of the present disclosure provides a network device is provided, including: a first transceiver, a first memory, and a first processor which is communicatively connected to the communicatively transceiver and the communicatively memory respectively, and is configured to control radio signal transceiving of the communicatively transceiver and implement:

- determine an actual transmission position of a target SSB according to various SSB positions being set in a radio frame; and
- send indication information of the actual transmission position to a terminal device,
- which the various SSB positions being set in the radio frame are spaced from each other by at least one OFDM symbol, and at least one slot in the radio frame includes two SSB positions.

An embodiment in a fourth aspect of the present disclosure provides a terminal device, comprising: a second transceiver, a second memory, and a second processor which is communicatively connected to the second transceiver and the second memory respectively, and the second processor is configured to control radio signal transceiving of the second transceiver and implement the method provided in the first aspect.

Additional aspects and advantages of the present disclosure will be partially given in the following description, and will partially become apparent from the following description or be learned from the practice of the present disclosure.

BRIEF DESCRIPTION OF THE DRAWINGS

The above and/or additional aspects and advantages of the present disclosure will become apparent and understandable from the description for the examples in conjunction with the drawings, where:

FIG. 1 is a schematic flowchart of a determination method for an SSB position provided by an embodiment of the present disclosure;

FIG. 2 is a schematic flowchart of another determination method for an SSB position provided by an embodiment of the present disclosure;

FIG. 3 is a schematic flowchart of another determination method for an SSB position provided by an embodiment of the present disclosure;

FIG. 4 is a schematic flowchart of another determination method for an SSB position provided by an embodiment of the present disclosure;

DETAILED DESCRIPTION

Figure 5:
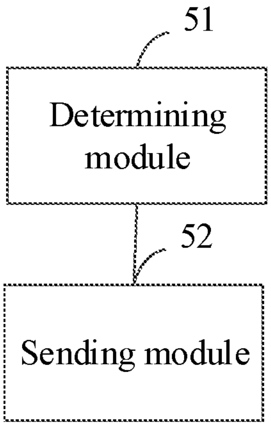
FIG. 5 is a schematic structural diagram of a determination apparatus for an SSB position provided by an embodiment of the present disclosure.

Examples will be described in detail here, and instances are shown in the accompanying drawings. The following description refers to the accompanying drawings in which the same numbers in different figures represent the same or similar elements unless otherwise indicated. Implementations described in the following examples do not represent all implementations consistent with the embodiments of the present disclosure. Instead, they are examples of apparatuses and methods consistent with some aspects of the embodiments of the present disclosure described as detailed in the appended claims.

The terms used in the embodiments of the present disclosure are for the purpose of describing specific embodiments, and are not intended to limit the embodiments of the present disclosure. The terms “a/an” and “the” in the singular form used in the embodiments of the present disclosure and the appended claims are also intended to include the plural form unless otherwise clearly indicated in the context. It should be further understood that the term "and/or" used here refers to and includes any or all possible combinations of one or more of the associated listed items.

It should be understood that although the terms "first," "second," "third," etc. may be used in the embodiments of the present disclosure to describe various information, the information should not be limited to these terms. These terms are used to distinguish the same type of information from one another. For example, without departing from the scope of the embodiments of the present disclosure, the first information may also be referred to as second information, and similarly, the second information may also be referred to as first information. Depending on the context, the word "if" as used herein may be interpreted as "when," "upon," or "in response to determining."

The embodiments of the present disclosure are described in detail below, and the examples of the embodiments are shown in the drawings, in which the same or similar reference numerals throughout represent the same or similar elements. The embodiments described below with reference to the accompanying drawings are exemplary and are used to explain the present disclosure, and cannot be interpreted as a limitation on the present disclosure.

In an NR system, each radio frame is divided into 10 equally sized subframes with a length of 1 ms, which a half radio frame includes 5 such subframes. Each subframe may include a plurality of slots according to different sub-carrier spaces. Each slot is composed of a certain amount of OFDM symbols, and a number of the OFDM symbols may depend on a type of a cyclic prefix (CP). The NR system supports sending of a synchronization signal (SS), a secondary synchronized signal, and a physical broadcast channel (PBCH) of a multi-beam. The SSB (also referred to as SS/PBCH block) generally occupies 4 OFDM symbols, located at a position related to the sub-carrier space, in a transmission window with a length being a half radio frame.

In a time domain, the 4 OFDM symbols occupied by one SSB include: a primary synchronized signal (PSS) for one OFDM, a secondary synchronized signal (SSS) for one OFDM symbol, and PBCHs for two OFDM symbols.

A higher sub-carrier space is used for the work band of 52.6-71 GHz compared with the work band below 52.6 GHz, which may be configured as 120 kHz, 240 kHz, or 480 kHz, and may reach up to 960 kHz. For example, in response to the sub-carrier space being 120 kHz and 240 kHz, OFDM symbol index values, relative to a starting point of the half radio frame, of SSB positions being set in the SSB half radio frame are both specified. However, there is still a lack of relevant stipulations in scenarios with the sub-carrier spaces being 480 kHz and 960 kHz. In the related art, an OFDM symbol index value, relative to the starting point of the half radio frame, of a SSB position being set in the SSB half radio frame is specified in a scenario with a smaller sub-carrier space (SCS), rather than being applied to a scenario with a larger sub-carrier space.

The following details the determination method and apparatus for the SSB position, the communication device, and a storage medium provided in the present disclosure, with reference to the accompanying drawings.

FIG. 1 is a schematic flowchart of a determination method for an SSB position provided by an embodiment of the present disclosure; and the method provided by this embodiment is executed by a network device.

The network device, having the work band larger than 52.6 GHz, is used for providing a wireless communication function for a terminal device. The network device may be a base station (BS). The network device may communicate wirelessly with the terminal device via one or more antennas. The network device may provide communication coverage for a geographic area where the network device is located. The base station may include different types of base stations, such as a macro base station, a micro base station, a relay station, and an access point. In some embodiments, the base station may be referred to by those skilled in the art as a base station transceiver, a wireless base station, an access point, a wireless transceiver, a basic service set (BSS), an extended service set (ESS), a NodeB, an evolved NodeB (eNB or eNodeB), or some other appropriate terms. For example, in a 5G system, the base station is referred to as gNB. For the convenience of description, in the embodiments of the present disclosure, the above-described apparatuses for providing the wireless communication function for the terminal device are collectively referred to as the network device.

As shown in FIG. 1, the method includes the following steps:

Step 101, determining an actual transmission position of a target SSB according to various SSB positions being set in a radio frame.

In the embodiments of the present disclosure, the mentioned radio frames may be one or more radio frames, or one or more half radio frames. An example description is made subsequently with the half radio frame. It can be understood by those skilled in the art that, on the basis of this, it may further be set that various SSB positions are set in one or more radio frames. The above various manners are all within the range of this embodiment.

A design solution of setting the various SSB positions in the half radio frame may be referred to as a mode or a pattern. The various SSB positions being set in the half radio frame may comply with the following setting condition:

the various SSB positions in the half radio frame are spaced from each other by at least one OFDM symbol, and at least one slot in the half radio frame includes two SSB positions.

The setting condition is explained and described below:

In the half radio frame, two adjacent SSB positions need to be spaced from each other by one or more OFDM symbols, and the spacing of OFDM symbols may be used for listen before talk (LBT) based on a beam in an unlicensed band. That is to say, the terminal device determines directions of one or more to-be-monitored beams, i.e., to-be-monitored beam directions, so as to determine a to-be-monitored beam requiring monitoring. The terminal device monitors one or more to-be-monitored beams at the OFDM symbols spacing the two adjacent SSB positions, to determine a beam adapting to data transmission, and then completes LBT based on the beam.

At least one slot in the half radio frame includes two SSB positions, so that at least one OFDM symbol is included in at least one slot for the terminal device completing LBT based on the beam.

During downlink synchronization of the NR, in a case of an actually transmitted target SSB being a cell-defined SSB, the terminal device further needs to find a corresponding control-resource set0 (CORESET0) according to the target SSB after blind detecting the target SSB, so that a physical downlink control channel (PDCCH) is blind detected in the CORESET0, to obtain downlink control information (DCI); and a physical downlink share channel (PDSCH) carrying a system information block (SIB) is in turn found. The NR defines several possible multiplexing modes of the SSB and the CORESET0. As a possible implementation method, the actually transmitted target SSB and its corresponding CORESET0 are present in one OFDM symbol, multiplexed in a frequency domain; that is, the target SSB and its corresponding control-resource set CORESET0 are synchronously carried on different sub-carrier frequencies.

With the increase in traffic, particularly in some urban areas, the licensed band may be difficult to meet the traffic demand. Therefore, in the related art, data is transmitted between an access network device and the terminal device by virtue of an unlicensed band, to meet the demand for greater traffic. The unlicensed band is a band divided by countries and regions, and capable of being used for communications of radio devices. For example, this band is usually considered to be a shared band; that is, communication devices in different communication systems may use the band as long as they meet the regulatory requirements set by the countries or regions on the band, and there is no need to apply to the government for exclusive band authorization. The unlicensed band may also be referred to by those skilled in the art as the shared band, an unlicensed spectrum, a license-exempt band, a license-exempt spectrum, a shared band, an unlicensed band, an unlicensed spectrum or some other appropriate terms.

A design solution for the SSB positions in the half radio frame is suitable for the licensed band, the unlicensed band, or both the licensed band and the unlicensed band. The design solution for the SSB positions in the half radio frame, suitable for the unlicensed band, may be the same or different from the design solution for the SSB positions in the half radio frame, suitable for the licensed band.

In some possible embodiments of the present disclosure, in the unlicensed band, the various SSB positions set by the design solution in the half radio frame may further comply with the situation that an alternative SSB position, which is configured for SSB transmission in the unlicensed band, is set in the half radio frame. For example, in a case of an SSB sending period, i.e., a DRS period, being 5 ms, for the sub-carrier spaces of 480 kHz and 960 kHz, 3 or 6 alternative SSB positions may be set. There is no need for a QCL value for the relevant indication due to more alternative SSB positions.

In further possible embodiments of the present disclosure, in the unlicensed band, the various SSB positions set by the design solution in the half radio frame may further comply with the situation that at least one of the SSB positions and an OFDM symbol adjacent thereto in the half radio frame correspond to one beam, and the adjacent OFDM symbol may be configured for uplink transmission. Uplink transmission here may include uplink control or uplink data, and may also include a random access channel. As the adjacent OFDM symbol may be used for uplink transmission, and the SSB position and the OFDM symbol adjacent thereto correspond to one beam, the terminal device may achieve uplink transmission without LBT in some possible scenarios.

In further possible embodiments of the present disclosure, in the licensed band, the various SSB positions set by the design solution in the half radio frame may further comply with the situation that a total number of the SSB positions being set in the radio frame is m times of L, which m is a natural number not equal to 0; and L is a maximum number of SSBs included in an SSB burst set. The total number of the SSB positions is an integer multiple of the maximum number of the SSBs included in the SSB burst set, so that the demand on SSB repeated sending may be met with such a design solution. For example, in a case of the maximum number of the SSBs included in the SSB burst set being 64, the total number of the SSB positions set in the half radio frame is 64 m, which meets the demand for m times of repeated sending. As a possible implementation method, in order to simplify relevant configuration information, for example, cancel an expression, by the quasi co-located (QCL) value, on an actual number of the SSBs in the SSB burst set, the maximum number of the SSBs included in the SSB burst set may be set as a fixed value.

Step 102, sending indication information of the actual transmission position to a terminal device.

The indication information of the actual transmission position includes: at least one of a high-layer parameter and an SSB time index.

As a possible scenario, the network device sends the target SSB at the actual transmission position, and the terminal device receiving the target SSB is an initially accessed terminal device. In response to the terminal device detecting the target SSB, the terminal device needs to know timing information in the target SSB, so as to achieve the purpose of downlink time synchronization. The timing information that the terminal device needs to know includes the slot index in a half radio frame and an OFDM symbol index in the slot.

The actual transmission position of the target SSB in the half radio frame is represented by the slot index of the target SSB in the half radio frame and the OFDM symbol index of the target SSB in the slot. In order to calculate the slot index of the target SSB in the half radio frame and the OFDM symbol index of the target SSB in the slot, the position of the target SSB in the SSB burst set is known. Transmission of one SSB burst set is limited to one half radio frame. One SSB burst set includes a plurality of SSBs. An arrangement order of various SSBs in the SSB burst set, and the number of slots in the half radio frame determine a specific slot of the SSB in the half radio frame and the position of the OFDM symbol in the slot. In order to make the terminal device know the position of the target SSB in the SSB burst set, the network device carries, in the target SSB, the index number of the target SSB in the SSB burst set, that is, an SSB time index.

In order to make the terminal device determine the position of the target SSB in the half radio frame according to the detected SSB time index, the OFDM symbol index values, relative to a starting point of the half radio frame, of various SSB positions in the half radio frame in various scenarios are further fixedly set. According to the detected SSB time index and the fixed OFDM symbol index values, relative to a starting point of the half radio frame, of various SSB positions in the half radio frame, the terminal device may determine the actual transmission position of the target SSB in the half radio frame, that is, at least one of the slot index of the target SSB in the half radio frame, and the OFDM symbol indexes of the SSB in the slot.

In another scenario, the terminal device receiving the target SSB has searched an initial cell and accesses the network device. The network device may indicate the actual transmission position by sending the high-layer parameter. The maximum number of the SSBs for one SSB burst set in each frequency range is specified in the NR protocol. In actual system deployment, a network may configure the positions and the number of the actually transmitted SSBs in the SSB burst set in each cell according to the size of a coverage area and an angle range covered by each SSB beam. That is, the number of the actually transmitted SSBs in one SSB burst set may be smaller than or equal to the maximum number specified in the protocol. Untransmitted SSB resources may be used for transmission of a PDSCH and the like. As a possible implementation method, the network device notifies the terminal device of the actual transmission positions, including the positions and the number of the SSBs, by virtue of the high-layer parameter such as SSB position burst (ssb-PositionsInBurst), which makes the terminal device correctly perform rate matching when receiving the PDSCH.

In the embodiments of the present disclosure, the actual transmission position of the target SSB is determined according to the various SSB positions being set in the half radio frame, which the various SSB positions being set in the half radio frame are spaced from each other by at least one OFDM symbol, and at least one slot in the half radio frame includes two SSB positions. The various SSB positions being set in the half radio frame are configured for a work band larger than 52.6 GHz, capable of being applied to SSB transmission in a scenario with a larger sub-carrier space. In addition, it is to be noted that the various SSB positions being set in the half radio frame provided in the embodiments of the present disclosure may be used for transmission of a cell-defined SSB having a sub-carrier space smaller than or equal to 240 kHz, or a cell-defined SSB having the sub-carrier space larger than 240 kHz, or a non-cell-defined SSB.

Determination methods and apparatuses for the SSB position and the communication device are provided by the embodiments of the present disclosure, the method includes: determining the actual transmission position of the target SSB according to the various SSB positions being set in the radio frame, which the various SSB positions being set in the radio frame are spaced from each other by the at least one OFDM symbol, and the at least one slot in the radio frame includes two SSB positions. The various SSB positions being set in the radio frame are configured for a work band larger than 52.6 GHz, capable of being applied to SSB transmission in a scenario with a large sub-carrier space in a work band of 52.6 GHz.

FIG. 2 is a schematic flowchart of another determination method for an SSB position provided by an embodiment of the present disclosure; and the method provided by this embodiment may be executed by a network device having the work band larger than 52.6 GHz.

The relevant definition of the network device refers to the relevant description of each embodiment in the present disclosure, which is not repeated in this embodiment.

As shown in FIG. 2, the method includes:

Step 201, determining OFDM symbol index values, relative to a starting point of a radio frame, of the various SSB positions in the radio frame according to the used sub-carrier space.

In the embodiments of the present disclosure, the mentioned radio frames may be one or more radio frames, or one or more half radio frames. A relevant description is made subsequently with the half radio frame as an example. It can be understood by those skilled in the art that, on the basis of this, it may further be set that various SSB positions are set in one or more radio frames. The above various manners are all within the range of this embodiment.

A design solution of setting the various SSB positions in the half radio frame may be referred to as a mode or a pattern, and different design solutions may be used at different sub-carrier spaces.

In the frequency band larger than 52.6 GHZ, the sub-carrier space (SCS) may be configured as 120 kHz, 240 kHz or 480 kHz, and may reach up to 960 kHz, which in response to the SCS being 120 kHz and 240 kHz, OFDM symbol index values, relative to a starting point of the half radio frame, of SSB positions being set in the SSB half radio frame are both specified by the NR system, which will not be repeated in this embodiment.

In the embodiment of the present disclosure, relevant descriptions will be made on the scenarios with the sub-carrier spaces being 480 kHz and 960 kHz.

In some embodiments of the present disclosure, the sub-carrier space is 480 kHz. In response to a sub-carrier space being 480 kHz, a range of an OFDM symbol index value in the half radio frame for a first OFDM symbol occupied by each SSB position is $\{16, 21, 26, 31, 36, 41, 46, 51\}+112n$, where n takes a value of 0 or 1. Each OFDM symbol index value in the value range corresponds to one SSB position being set, and two SSB positions are set in each slot.

In some embodiments of the present disclosure, the sub-carrier space is 960 kHz. In response to a sub-carrier space being 960 kHz, a range of an OFDM symbol index value in the half radio frame for the first OFDM symbol occupied by each SSB position is $\{16, 21, 26, 31, 36, 41, 46, 51, 56, 61, 66, 71, 76, 81, 86, 91\}+112n$, which n takes a value of 0 or 1. Each OFDM symbol index value in the value range corresponds to one SSB position being set, and two SSB positions are set in each slot.

Step 202, determining the actual transmission position of the target SSB according to OFDM symbol index values, relative to the starting point of the radio frame, of the various SSB positions in the radio frame.

A range of the OFDM symbol index value in the half radio frame for the first OFDM symbol occupied by each SSB position is determined according to the sub-carrier space. In turn, the OFDM symbol index value is selected from the range of the OFDM symbol index value; and the SSB position corresponding to the selected OFDM symbol index value is determined as the actual transmission position of the target SSB.

Step 203, sending indication information of the actual transmission position to the terminal device.

The indication information of the actual transmission position includes: at least one of a high-layer parameter and an SSB time index.

In a possible scenario, the network device sends the target SSB, and the terminal device receiving the target SSB is an initially accessed terminal device. In response to the terminal device detecting the target SSB, the terminal device needs to know timing information in the target SSB, so as to achieve a purpose of downlink time synchronization. The timing information that the terminal device needs to know includes the slot index in a half radio frame and an OFDM symbol index in the slot.

The actual transmission position of the target SSB in the half radio frame is represented by the slot index of the target SSB in the half radio frame and the OFDM symbol index of the target SSB in the slot. In order to calculate the slot index of the target SSB in the half radio frame and the OFDM symbol index of the target SSB in the slot, the terminal device needs to know the position of the target SSB in the SSB burst set. Transmission of one SSB burst set is limited to one half radio frame. One SSB burst set includes a plurality of SSBs. An arrangement order of various SSBs in the SSB burst set, and the number of slots in the half radio frame determine a specific slot of the SSB in the half radio frame and the position of the OFDM symbol in the slot. In order to make the terminal device know the position of the target SSB in the SSB burst set, the network device carries, in the target SSB, the index number of the target SSB in the SSB burst set, that is, an SSB time index. For example, the SSB time index is 2, that is, the corresponding target SSB is an SSB at a third SSB position in the half radio frame.

In order to make the terminal device determine the position of the target SSB in the half radio frame according to the detected SSB time index, the OFDM symbol index values, relative to the starting point of the half radio frame, of the various SSB positions in the half radio frame in various scenarios are fixedly set. According to the detected SSB time index and the fixed OFDM symbol index values, relative to the starting point of the half radio frame, of the various SSB positions in the half radio frame, the terminal device may determine the actual transmission position of the target SSB in the half radio frame, that is, at least one of the slot index of the target SSB in the half radio frame, and the OFDM symbol indexes of the SSB in the slot.

For example, in the case of the sub-carrier space being 480 kHz, the terminal device, according to the SSB time index of 2, may determine that the target SSB is an SSB at the third SSB position in the half radio frame. The range of the OFDM symbol index value is {16, 21, 26, 31, 36, 41, 46, 51}+112n, that is, the index value of the OFDM symbol, relative to the starting point of the half radio frame, of the target SSB is 26.

In another scenario, the terminal device receiving the target SSB has searched an initial cell and accesses the network device. The network device may indicate the actual transmission position by sending the high-layer parameter. The maximum number of SSBs for one SSB burst set in each frequency range is specified in the NR protocol. In actual system deployment, a network may configure the positions and the number of the actually transmitted SSBs in the SSB burst set in each cell according to the size of a coverage area and an angle range covered by each SSB beam. That is, the number of the actually transmitted SSBs in one SSB burst set may be smaller than or equal to the maximum number specified in the protocol. Untransmitted SSB resources may be used for transmission of a PDSCH and the like. As a possible implementation method, the network device notifies the terminal device of the actual transmission positions, including the positions and the number of the SSBs, by virtue of the high-layer parameter such as ssb-PositionsInBurst, which makes the terminal device correctly perform rate matching when receiving the PDSCH. For example, the high-layer parameter may be in the form of a bit map. Each bit represents whether the corresponding SSB position is actually used for transmission of the target SSB, that is, whether it is the actual transmission position. Therefore, the terminal device determines the actual transmission position of the target SSB according to the high-layer parameter.

In the embodiments of the present disclosure, the actual transmission position of the target SSB is determined according to the various SSB positions being set in the half radio frame, which the various SSB positions being set in the half radio frame are spaced from each other by at least one OFDM symbol, and at least one slot in the half radio frame includes two SSB positions. The various SSB positions being set in the half radio frame are configured for a work band larger than 52.6 GHz, capable of being applied to SSB transmission in a scenario with a larger sub-carrier space.

FIG. 3 is a schematic flowchart of another determination method for an SSB position provided by an embodiment of the present disclosure; and the method provided by this embodiment is executed by a terminal device.

The terminal devices, having the work band larger than 52.6 GHZ, may be distributed throughout a mobile communication system, and each terminal device may be stationary or mobile. The terminal device may also be referred to by those skilled in the art as a mobile station, a user station, a mobile unit, a user unit, a wireless unit, a remote unit, a mobile device, a user equipment, a wireless device, a wireless communication device, a remote device, a mobile user station, an access terminal device, a mobile terminal device, a wireless terminal device, a remote terminal device, a handheld device, a user agent, a mobile client, a client, or some other appropriate terms. The terminal device may be a cellular telephone, a personal digital assistant (PDA), a wireless modem, a wireless communication device, a handheld device, a tablet computer, a laptop computer, a cordless telephone, a wireless local loop (WLL) station, and the like. The terminal device can communicate with the network device in the mobile communication system.

As shown in FIG. 3, including the following steps:

Step 301, determining an actual transmission position of a target SSB according to the position indication information sent by the network device and the various SSB positions being set in the radio frame, which the various SSB positions being set in the radio frame are spaced from each other by at least one OFDM symbol, and at least one slot in the radio frame includes two SSB positions.

In the embodiments of the present disclosure, the mentioned radio frames may be one or more radio frames, or one or more half radio frames. A relevant description is made subsequently with the half radio frame as an example. It can be understood by those skilled in the art that, on the basis of this, it may further be set that various SSB positions are set in one or more radio frames. The above various manners are all within the range of this embodiment.

In the embodiments of the present disclosure, a design solution of setting the various SSB positions in the half radio frame may be referred to as a mode or a pattern. The various SSB positions being set in the half radio frame may comply with the following setting condition:

The various SSB positions in the half radio frame are spaced from each other by at least one OFDM symbol, and at least one slot in the half radio frame includes two SSB positions.

The setting condition is explained and described below:

In the half radio frame, two adjacent SSB positions need to be spaced from each other by one or more OFDM symbols; and the spacing OFDM symbols may be used for LBT based on a beam in an unlicensed band. That is to say, the terminal device determines directions of one or more to-be-monitored beams, i.e., to-be-monitored beam directions, so as to determine a to-be-monitored beam requiring monitoring. The terminal device monitors one or more to-be-monitored beams at the OFDM symbols spacing the two adjacent SSB positions, to determine a beam adapting to data transmission, and then completes LBT based on the beam.

At least one slot in the half radio frame includes two SSB positions, so that at least one OFDM symbol is included in at least one slot for the terminal device completing LBT based on the beam.

During downlink synchronization of the NR, in the case of the actually transmitted target SSB being a cell-defined SSB, the terminal device further needs to find a corresponding CORESET0 according to the target SSB after blind detecting the target SSB, so that a PDCCH is blind detected in the CORESET0, to obtain DCI; and a PDSCH carrying an SIB is in turn found. The NR defines several possible multiplexing modes of the SSB and the CORESET0. As a possible implementation method, the actually transmitted target SSB and its corresponding CORESET0 are present in one OFDM symbol, multiplexed in a frequency domain; that is, the target SSB and its corresponding control-resource set CORESET0 are synchronously carried on different sub-carrier frequencies.

A design solution for the SSB positions in the half radio frame is suitable for the licensed band, or the unlicensed band, or both the licensed band and the unlicensed band. That is to say, the design solution for the SSB positions in the half radio frame, suitable for the unlicensed band, may be the same or different from the design solution for the SSB positions in the half radio frame, suitable for the licensed band.

In some possible embodiments of the present disclosure, in the unlicensed band, the various SSB positions set by the design solution in the half radio frame may further comply with the situation that an alternative SSB position, which is configured for SSB transmission in the unlicensed band, is set in the half radio frame. For example, in a case of an SSB sending period, i.e., a DRS period, being 5 ms, for the sub-carrier spaces of 480 kHz and 960 kHz, 3 or 6 alternative SSB positions may be set. There is no need for a QCL value for the relevant indication due to more alternative SSB positions.

In further possible embodiments of the present disclosure, in the unlicensed band, the various SSB positions set by the design solution in the half radio frame may further comply with the situation that at least one of the SSB positions and an OFDM symbol adjacent thereto in the half radio frame correspond to one beam, and the adjacent OFDM symbol may be configured for uplink transmission. Uplink transmission here may include uplink control or uplink data, and may also include a random access channel. As the adjacent OFDM symbol may be used for uplink transmission, and the SSB position and the OFDM symbol adjacent thereto correspond to one beam, the terminal device may achieve uplink transmission without LBT in some possible scenarios.

In further possible embodiments of the present disclosure, in the licensed band, the various SSB positions set by the design solution in the half radio frame may further comply with the situation that a total number of the SSB positions being set in the radio frame is m times of L, which m is a natural number not equal to 0; and L is a maximum number of SSBs included in an SSB burst set. The total number of the SSB positions is an integer multiple of the maximum number of the SSBs included in the SSB burst set, so that the demand on SSB repeated sending may be met with such a design solution. For example, in a case of the maximum number of the SSBs included in the SSB burst set being 64, the total number of the SSB positions set in the half radio frame is 64 m, which meets the demand for m times of repeated sending. As a possible implementation method, in order to simplify relevant configuration information, for example, cancel an expression, by the QCL value, on an actual number of the SSBs in the SSB burst set, the maximum number of the SSBs included in the SSB burst set may be set as a fixed value.

In the embodiments of the present disclosure, the indication information of the actual transmission position includes: at least one of a high-layer parameter and an SSB time index.

As a possible scenario, the network device sends the target SSB at the actual transmission position, and the terminal device receiving the target SSB is an initially accessed terminal device. In response to the terminal device detecting the target SSB, the terminal device needs to know timing information in the target SSB, so as to achieve the purpose of downlink time synchronization. The timing information that the terminal device needs to know includes slot index in a half radio frame and an OFDM symbol index in the slot.

The actual transmission position of the target SSB in the half radio frame is represented by the slot index of the target SSB in the half radio frame and the OFDM symbol index of the target SSB in the slot. In order to calculate the slot index of the target SSB in the half radio frame and the OFDM symbol index of the target SSB in the slot, the position of the target SSB in the SSB burst set is known. Transmission of one SSB burst set is limited to one half radio frame. One SSB burst set includes a plurality of SSBs. An arrangement order of various SSBs in the SSB burst set, and the number of the slots in the half radio frame determines a specific slot of the SSB in the half radio frame and the position of the OFDM symbol in the slot. In order to make the terminal device know the position of the target SSB in the SSB burst set, the network device carries, in the target SSB, the index number of the target SSB in the SSB burst set, that is, an SSB time index.

In order to make the terminal device determine the position of the target SSB in the half radio frame according to the detected SSB time index, the OFDM symbol index values, relative to the starting point of the half radio frame, of various SSB positions in the half radio frame in various scenarios are further fixedly set. According to the detected SSB time index and the fixed OFDM symbol index values, relative to the starting point of the half radio frame, of the various SSB positions in the half radio frame, the terminal device may determine the actual transmission position of the target SSB in the half radio frame, that is, at least one of the slot index of the target SSB in the half radio frame, and the OFDM symbol indexes of the SSB in the slot.

In another scenario, the terminal device receiving the target SSB has searched an initial cell, and accesses to the network device. The network device may indicate the actual transmission position by sending the high-layer parameter. The maximum number of the SSBs for one SSB burst set in each frequency range is specified in the NR protocol. In actual system deployment, a network may configure the positions and the number of the actually transmitted SSBs in the SSB burst set in each cell according to the size of a coverage area and an angle range covered by each SSB beam. That is, the number of the actually transmitted SSBs in one SSB burst set may be smaller than or equal to the maximum number specified in the protocol. Untransmitted SSB resources may be used for transmission of a PDSCH and the like. As a possible implementation method, the network device notifies the terminal device of the actual transmission positions, including the positions and the number of the SSBs, by virtue of the high-layer parameter such as ssb-PositionsInBurst, which makes the terminal device correctly perform rate matching when receiving the PDSCH.

In the embodiments of the present disclosure, the actual transmission position of the target SSB is determined according to the various SSB positions being set in the half radio frame, which the various SSB positions being set in the half radio frame are spaced from each other by at least one OFDM symbol, and at least one slot in the half radio frame includes two SSB positions. The various SSB positions being set in the half radio frame are configured for a work band larger than 52.6 GHz, capable of being applied to SSB transmission in a scenario with a larger sub-carrier space. In addition, it is to be noted that the various SSB positions being set in the half radio frame provided in the embodiments of the present disclosure may be used for transmission of a cell-defined SSB having a sub-carrier space smaller than or equal to 240 kHz, or a cell-defined SSB having the sub-carrier space larger than 240 kHz, or a non-cell-defined SSB.

FIG. 4 is a schematic flowchart of another determination method for an SSB position provided by an embodiment of the present disclosure; and the method provided by this embodiment may be executed by a terminal device having the work band larger than 52.6 GHz.

The relevant definition of the terminal device refers to the relevant description of each embodiment in the present disclosure, which is not repeated in this embodiment.

As shown in FIG. 4, the method includes:

Step 401, determining OFDM symbol index values, relative to a starting point of a radio frame, of the various SSB positions in the radio frame according to a sub-carrier space of a target SSB.

In the embodiments of the present disclosure, the mentioned radio frames may be one or more radio frames, or one or more half radio frames. A relevant description is made subsequently with the half radio frame as an example. It can be understood by those skilled in the art that, on the basis of this, it may further be set that various SSB positions are set in one or more radio frames. The above various manners are all within the range of this embodiment.

A design solution of setting the various SSB positions in the half radio frame may be referred to as a mode or a pattern, and different design solutions may be used at different sub-carrier spaces.

In the frequency band larger than 52.6 GHZ, the sub-carrier space may be configured as 120 kHz, 240 kHz or 480 kHz, and may reach up to 960 kHz, which in response to the SCS being 120 kHz and 240 kHz, OFDM symbol index values, relative to a starting point of the half radio frame, of SSB positions being set in the SSB half radio frame are both specified by the NR system, which will not be repeated in this embodiment.

In the embodiment of the present disclosure, relevant descriptions will be made on the scenarios with the sub-carrier spaces being 480 kHz and 960 kHz.

In some embodiments of the present disclosure, the sub-carrier space is 480 kHz. In response to a sub-carrier space being 480 kHz, a range of an OFDM symbol index value in the half radio frame for a first OFDM symbol occupied by each SSB position is {16, 21, 26, 31, 36, 41, 46, 51}+112n, where n takes a value of 0 or 1. Each OFDM symbol index value in the value range corresponds to one SSB position being set, and two SSB positions are set in each slot.

In some embodiments of the present disclosure, the sub-carrier space is 960 kHz. In response to a sub-carrier space being 960 kHz, a range of an OFDM symbol index value in the half radio frame for the first OFDM symbol occupied by each SSB position is {16, 21, 26, 31, 36, 41, 46, 51, 56, 61, 66, 71, 76, 81, 86, 91}+112n, which n takes a value of 0 or 1. Each OFDM symbol index value in the value range corresponds to one SSB position being set, and two SSB positions are set in each slot.

Step 402, determining the actual transmission position of the target SSB according to OFDM symbol index values, relative to the starting point of the radio frame, of the various SSB positions in the radio frame, and position indication information sent by the network device.

The range of the OFDM symbol index value in the half radio frame for the first OFDM symbol occupied by each SSB position is known according to the sub-carrier space, through which, in combination with the position indication information sent by the network device, the actual transmission position of the target SSB in the half radio frame may be determined.

The indication information of the actual transmission position includes: at least one of a high-layer parameter and an SSB time index.

In a possible scenario, the network device sends the target SSB, and the terminal device receiving the target SSB is an initially accessed terminal device. In response to the terminal device detecting the target SSB, the terminal device needs to know timing information in the target SSB, so as to achieve a purpose of downlink time synchronization. The timing information that the terminal device needs to know includes a slot index in a half radio frame and an OFDM symbol index in the slot.

The actual transmission position of the target SSB in the half radio frame is represented by the slot index of the target SSB in the half radio frame and the OFDM symbol index of the target SSB in the slot. In order to calculate the slot index of the target SSB in the half radio frame and the OFDM symbol index of the target SSB in the slot, the terminal device needs to know the position of the target SSB in the SSB burst set. Transmission of one SSB burst set is limited in one half radio frame. One SSB burst set includes a plurality of SSBs. An arrangement order of various SSBs in the SSB burst set, and the number of the slots in the half radio frame determines a specific slot of the SSB in the half radio frame and the position of the OFDM symbol in the slot. In order to make the terminal device know the position of the target SSB in the SSB burst set, the network device carries, in the target SSB, the index number of the target SSB in the SSB burst set, that is, an SSB time index. For example, the SSB time index is 2. That is, the corresponding target SSB is an SSB at a third SSB position in the half radio frame.

In order to make the terminal device determine the position of the target SSB in the half radio frame according to the detected SSB time index, the OFDM symbol index values, relative to the starting point of the half radio frame, of the various SSB positions in the half radio frame in various scenarios are fixedly set. According to the detected SSB time index and the fixed OFDM symbol index values, relative to the starting point of the half radio frame, of the various SSB positions in the half radio frame, the terminal device may determine the actual transmission position of the target SSB in the half radio frame, that is, at least one of the slot index of the target SSB in the half radio frame, and the OFDM symbol indexes of the SSB in the slot.

For example, in the case of the sub-carrier space being 480 kHz, the terminal device, according to the SSB time index of 2, may determine that the target SSB is an SSB at the third SSB position in the half radio frame. The range of the OFDM symbol index value is {16, 21, 26, 31, 36, 41, 46, 51}+112n, that is, the index value of the OFDM symbol, relative to the starting point of the half radio frame, of the target SSB is 26.

In another scenario, the terminal device receiving the target SSB has searched an initial cell and accesses the network device. The network device may indicate the actual transmission position by sending the high-layer parameter. The maximum number of the SSBs for one SSB burst set in each frequency range is specified in the NR protocol. In actual system deployment, a network may configure the positions and the number of the actually transmitted SSBs in the SSB burst set in each cell according to the size of a coverage area and an angle range covered by each SSB beam. That is, the number of the actually transmitted SSBs in one SSB burst set may be smaller than or equal to the maximum number specified in the protocol. Untransmitted SSB resources may be used for transmission of a PDSCH and the like. As a possible implementation method, the network device notifies the terminal device of the actual transmission positions, including the positions and the number of the SSBs, by virtue of the high-layer parameter such as ssb-PositionsInBurst, which makes the terminal device correctly perform rate matching when receiving the PDSCH. For example, the high-layer parameter may be in a form of a bit map. Each bit represents whether the corresponding SSB position is actually used for transmission of the target SSB, that is, whether it is the actual transmission position. Therefore, the terminal device determines the actual transmission position of the target SSB according to the high-layer parameter.

In the embodiments of the present disclosure, the actual transmission position of the target SSB is determined according to the various SSB positions being set in the half radio frame, which the various SSB positions being set in the half radio frame are spaced from each other by at least one OFDM symbol, and at least one slot in the half radio frame includes two SSB positions. The various SSB positions being set in the half radio frame are configured for a work band larger than 52.6 GHz, capable of being applied to SSB transmission in a scenario with a larger sub-carrier space.

FIG. 5 is a schematic structural diagram of a determination apparatus for an SSB position provided by an embodiment of the present disclosure; and the apparatus provided by this embodiment may be performed by a network device having the work band larger than 52.6 GHz. The apparatus includes:

- a determining module 51, configured to determine an actual transmission position of a target SSB according to various SSB positions being set in a radio frame, where the various SSB positions being set in the radio frame are spaced from each other by at least one OFDM symbol, and at least one slot in the radio frame includes two SSB positions.

In the embodiments of the present disclosure, the mentioned radio frames may be one or more radio frames, or one or more half radio frames. A relevant description is made subsequently with the half radio frame as an example. It can be understood by those skilled in the art that, on the basis of this, it may further be set that various SSB positions are set in one or more radio frames. The above various manners are all within the range of this embodiment.

A design solution of setting the various SSB positions in the half radio frame may be referred to as a mode or a pattern. The various SSB positions being set in the half radio frame may comply with the following setting condition:

The various SSB positions in the half radio frame are spaced from each other by at least one OFDM symbol, and at least one slot in the half radio frame includes two SSB positions.

The setting condition is explained and described below:

In the half radio frame, two adjacent SSB positions need to be spaced from each other by one or more OFDM symbols, and the spacing of OFDM symbols may be used for listen before talk (LBT) based on a beam in an unlicensed band. That is to say, the terminal device determines directions of one or more to-be-monitored beams, i.e., to-be-monitored beam directions, so as to determine a to-be-monitored beam requiring monitoring. The terminal device monitors one or more to-be-monitored beams at the OFDM symbols spacing the two adjacent SSB positions, to determine a beam adapting to data transmission, and then completes LBT based on the beam.

At least one slot in the half radio frame includes two SSB positions, so that at least one OFDM symbol is included in at least one slot for the terminal device completing LBT based on the beam.

During downlink synchronization of the NR, in a case of the actually transmitted target SSB being a cell-defined SSB, the terminal device further needs to find a corresponding CORESET0 according to the target SSB after blind detecting the target SSB, so that a PDCCH is blind detected in the CORESET0, to obtain DCI; and a PDSCH carrying an SIB is in turn found. The NR defines several possible multiplexing modes of the SSB and the CORESET0. As a possible implementation method, the actually transmitted target SSB and its corresponding CORESET0 are present in one OFDM symbol, multiplexed in a frequency domain; that is, the target SSB and its corresponding control-resource set CORESET0 are synchronously carried on different sub-carrier frequencies.

A design solution for the SSB positions in the half radio frame is suitable for the licensed band, the unlicensed band, or both the licensed band and the unlicensed band. That is to say, the design solution for the SSB positions in the half radio frame, suitable for the unlicensed band, may be the same or different from the design solution for the SSB positions in the half radio frame, suitable for the licensed band.

In some possible embodiments of the present disclosure, in the unlicensed band, the various SSB positions set by the design solution in the half radio frame may further comply with the situation that an alternative SSB position, which is configured for SSB transmission in the unlicensed band, is set in the half radio frame. For example, in a case of an SSB sending period, i.e., a DRS period, being 5 ms, for the sub-carrier spaces of 480 kHz and 960 kHz, 3 or 6 alternative SSB positions may be set. There is no need for a QCL value for the relevant indication due to more alternative SSB positions.

In further possible embodiments of the present disclosure, in the unlicensed band, the various SSB positions set by the design solution in the half radio frame may further comply with the situation that at least one of the SSB positions and an OFDM symbol adjacent thereto in the half radio frame correspond to one beam, and the adjacent OFDM symbol may be configured for uplink transmission. Uplink transmission here may include uplink control or uplink data, and may also include a random access channel. As the adjacent OFDM symbol may be used for uplink transmission, and the SSB position and the OFDM symbol adjacent thereto correspond to one beam, the terminal device may achieve uplink transmission without LBT in some possible scenarios.

In further possible embodiments of the present disclosure, in the licensed band, the various SSB positions set by the design solution in the half radio frame may further comply with the situation that a total number of the SSB positions being set in the radio frame is m times of L, which m is a natural number not equal to 0; and L is a maximum number of SSBs included in an SSB burst set. The total number of the SSB positions is an integer multiple of the maximum number of the SSBs included in the SSB burst set, so that the demand on SSB repeated sending may be met with such a design solution. For example, in a case of the maximum number of the SSBs included in the SSB burst set being 64, the total number of the SSB positions set in the half radio frame is 64 m, which meets the demand on m times of repeated sending. As a possible implementation method, in order to simplify relevant configuration information, for example, cancel an expression, by the QCL value, on an actual number of the SSBs in the SSB burst set, the maximum number of the SSBs included in the SSB burst set may be set as a fixed value.

A sending module 52 is configured to send indication information of the actual transmission position to a terminal device.

The indication information of the actual transmission position includes: at least one of a high-layer parameter and an SSB time index.

As a possible scenario, the network device sends the target SSB at the actual transmission position, and the terminal device receiving the target SSB is an initially accessed terminal device. In response to the terminal device detecting the target SSB, the terminal device needs to know timing information in the target SSB, so as to achieve a purpose of downlink time synchronization. The timing information that the terminal device needs to know includes slot index in a half radio frame and an OFDM symbol index in the slot.

The actual transmission position of the target SSB in the half radio frame is represented by the slot index of the target SSB in the half radio frame and the OFDM symbol index of the target SSB in the slot. In order to calculate the slot index of the target SSB in the half radio frame and the OFDM symbol index of the target SSB in the slot, the position of the target SSB in the SSB burst set is known. Transmission of one SSB burst set is limited to one half radio frame. One SSB burst set includes a plurality of SSBs. An arrangement order of various SSBs in the SSB burst set, and the number of the slots in the half radio frame determines a specific slot of the SSB in the half radio frame and the position of the OFDM symbol in the slot. In order to make the terminal device know the position of the target SSB in the SSB burst set, the network device carries, in the target SSB, the index number of the target SSB in the SSB burst set, that is, an SSB time index.

In order to make the terminal device determine the position of the target SSB in the half radio frame according to the detected SSB time index, the OFDM symbol index values, relative to the starting point of the half radio frame, of various SSB positions in the half radio frame in various scenarios are further fixedly set. According to the detected SSB time index and the fixed OFDM symbol index values, relative to the starting point of the half radio frame, of the various SSB positions in the half radio frame, the terminal device may determine the actual transmission position of the target SSB in the half radio frame, that is, at least one of the slot index of the target SSB in the half radio frame, and the OFDM symbol indexes of the SSB in the slot.

In another scenario, the terminal device receiving the target SSB has searched an initial cell and accesses the network device. The network device may indicate the actual transmission position by sending the high-layer parameter. The maximum number of the SSBs for one SSB burst set in each frequency range is specified in the NR protocol. In actual system deployment, a network may configure the positions and the number of the actually transmitted SSBs in the SSB burst set in each cell according to the size of a coverage area and an angle range covered by each SSB beam. That is, the number of the actually transmitted SSBs in one SSB burst set may be smaller than or equal to the maximum number specified in the protocol. Untransmitted SSB resources may be used for transmission of the PDSCH and the like. As a possible implementation method, the network device notifies the terminal device of the actual transmission positions, including the positions and the number of the SSBs, by virtue of the high-layer parameter such as ssb-PositionsInBurst, which makes the terminal device correctly perform rate matching when receiving the PDSCH.

In the embodiments of the present disclosure, the actual transmission position of the target SSB is determined according to the various SSB positions being set in the half radio frame, which the various SSB positions being set in the half radio frame are spaced from each other by at least one OFDM symbol, and at least one slot in the half radio frame includes two SSB positions. The various SSB positions being set in the half radio frame are configured for a work band larger than 52.6 GHz, capable of being applied to SSB transmission in a scenario with a larger sub-carrier space. In addition, it is to be noted that the various SSB positions being set in the half radio frame provided in the embodiments of the present disclosure may be used for transmission of a cell-defined SSB having a sub-carrier space smaller than or equal to 240 kHz, or a cell-defined SSB having the sub-carrier space larger than 240 kHz, or a non-cell-defined SSB.

Figure 6:
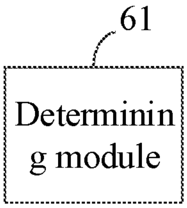
FIG. 6 is a schematic structural diagram of another determination apparatus for an SSB position provided by an embodiment of the present disclosure.

FIG. 6 is a schematic structural diagram of a determination apparatus for an SSB position provided by an embodiment of the present disclosure; and the apparatus provided by this embodiment may be performed by a terminal device having the work band larger than 52.6 GHz. The apparatus includes:

- a determining module 61, configured to determine an actual transmission position of a target SSB according to the position indication information sent by the network device and the various SSB positions being set in the radio frame, which the various SSB positions being set in the radio frame are spaced from each other by at least one OFDM symbol, and at least one slot in the radio frame includes two SSB positions.

In the embodiments of the present disclosure, the mentioned radio frames may be one or more radio frames, or one or more half radio frames. A relevant description is made subsequently with the half radio frame as an example. It can be understood by those skilled in the art that, on the basis of this, it may further be set that various SSB positions are set in one or more radio frames. The above various manners are all within the range of this embodiment.

A design solution of setting the various SSB positions in the half radio frame may be referred to as a mode or a pattern. The various SSB positions being set in the half radio frame may comply with the following setting condition:

The various SSB positions in the half radio frame are spaced from each other by at least one OFDM symbol, and at least one slot in the half radio frame includes two SSB positions.

The setting condition is explained and described below:

In the half radio frame, two adjacent SSB positions need to be spaced from each other by one or more OFDM symbols; and the spacing OFDM symbols may be used for LBT based on a beam in an unlicensed band. That is to say, the terminal device determines directions of one or more to-be-monitored beams, i.e., to-be-monitored beam directions, so as to determine a to-be-monitored beam requiring monitoring. The terminal device monitors one or more to-be-monitored beams at the OFDM symbols spacing the two adjacent SSB positions, to determine a beam adapting to data transmission, and then completes LBT based on the beam.

At least one slot in the half radio frame includes two SSB positions, so that at least one OFDM symbol is included in at least one slot for the terminal device completing LBT based on the beam.

During downlink synchronization of the NR, in a case of the actually transmitted target SSB being a cell-defined SSB, the terminal device further needs to find a corresponding CORESET0 according to the target SSB after blind detecting the target SSB, so that a PDCCH is blind detected in the CORESET0, to obtain DCI; and a PDSCH carrying an SIB is in turn found. The NR defines several possible multiplexing modes of the SSB and the CORESET0. As a possible implementation method, the actually transmitted target SSB and its corresponding CORESET0 are present in one OFDM symbol, multiplexed in a frequency domain; that is, the target SSB and its corresponding control-resource set CORESET0 are synchronously carried on different sub-carrier frequencies.

A design solution for the SSB positions in the half radio frame is suitable for the licensed band, the unlicensed band, or both the licensed band and the unlicensed band. That is to say, the design solution for the SSB positions in the half radio frame, suitable for the unlicensed band, may be the same or different from the design solution for the SSB positions in the half radio frame, suitable for the licensed band.

In possible embodiments of the present disclosure, in the unlicensed band, the various SSB positions set by the design solution in the half radio frame may further comply with the situation that an alternative SSB position, which is configured for SSB transmission in the unlicensed band, is set in the half radio frame. For example, in a case of an SSB sending period, i.e., a DRS period, being 5 ms, for the sub-carrier spaces of 480 kHz and 960 kHz, 3 or 6 alternative SSB positions may be set. There is no need for a QCL value for the relevant indication due to more alternative SSB positions.

In further possible embodiments of the present disclosure, in the unlicensed band, the various SSB positions set by the design solution in the half radio frame may further comply with the situation that at least one of the SSB positions and an OFDM symbol adjacent thereto in the half radio frame correspond to one beam, and the adjacent OFDM symbol may be configured for uplink transmission. Uplink transmission here may include uplink control or uplink data, and may also include a random access channel. As the adjacent OFDM symbol may be used for uplink transmission, and the SSB position and the OFDM symbol adjacent thereto correspond to one beam, the terminal device may achieve uplink transmission without LBT in some possible scenarios.

In further possible embodiments of the present disclosure, in the licensed band, the various SSB positions set by the design solution in the half radio frame may further comply with the situation that a total number of the SSB positions being set in the radio frame is m times of L, which m is a natural number not equal to 0; and L is a maximum number of SSBs included in an SSB burst set. The total number of the SSB positions is an integer multiple of the maximum number of the SSBs included in the SSB burst set, so that the demand on SSB repeated sending may be met with such the design solution. For example, in a case of the maximum number of the SSBs included in the SSB burst set being 64, the total number of the SSB positions set in the half radio frame is 64 m, which meets the demand on m times of repeated sending. As a possible implementation method, in order to simplify relevant configuration information, for example, cancel an expression, by the QCL value, on an actual number of the SSBs in the SSB burst set, the maximum number of the SSBs included in the SSB burst set may be set as a fixed value.

In the embodiments of the present disclosure, the indication information of the actual transmission position includes: at least one of a high-layer parameter and an SSB time index.

As a possible scenario, the network device sends the target SSB at the actual transmission position, and the terminal device receiving the target SSB is an initially accessed terminal device. In response to the terminal device detecting the target SSB, the terminal device needs to know timing information in the target SSB, so as to achieve the purpose of downlink time synchronization. The timing information that the terminal device needs to know includes slot index in a half radio frame and an OFDM symbol index in the slot.

The actual transmission position of the target SSB in the half radio frame is represented by the slot index of the target SSB in the half radio frame and the OFDM symbol index of the target SSB in the slot. In order to calculate the slot index of the target SSB in the half radio frame and the OFDM symbol index of the target SSB in the slot, the position of the target SSB in the SSB burst set is known. Transmission of one SSB burst set is limited to one half radio frame. One SSB burst set includes a plurality of SSBs. An arrangement order of various SSBs in the SSB burst set, and the number of the slots in the half radio frame determine a specific slot of the SSB in the half radio frame and the position of the OFDM symbol in the slot. In order to make the terminal device know the position of the target SSB in the SSB burst set, the network device carries, in the target SSB, the index number of the target SSB in the SSB burst set, that is, an SSB time index.

In order to make the terminal device determine the position of the target SSB in the half radio frame according to the detected SSB time index, the OFDM symbol index values, relative to the starting point of the half radio frame, of various SSB positions in the half radio frame in various scenarios are further fixedly set. According to the detected SSB time index and the fixed OFDM symbol index values, relative to the starting point of the half radio frame, of the various SSB positions in the half radio frame, the terminal device may determine the actual transmission position of the target SSB in the half radio frame, that is, at least one of the slot index of the target SSB in the half radio frame, and the OFDM symbol indexes of the SSB in the slot.

In some embodiments of the present disclosure, the sub-carrier space is 480 kHz. In response to a sub-carrier space being 480 kHz, a range of an OFDM symbol index value in the half radio frame for a first OFDM symbol occupied by each SSB position is $\{16, 21, 26, 31, 36, 41, 46, 51\}+112n$, where n takes a value of 0 or 1. Each OFDM symbol index value in the value range corresponds to one SSB position being set, and two SSB positions are set in each slot.

In some embodiments of the present disclosure, the sub-carrier space is 960 kHz. In response to a sub-carrier space being 960 kHz, a range of an OFDM symbol index value in the half radio frame for the first OFDM symbol occupied by each SSB position is $\{16, 21, 26, 31, 36, 41, 46, 51, 56, 61, 66, 71, 76, 81, 86, 91\}+112n$, which n takes a value of 0 or 1. Each OFDM symbol index value in the value range corresponds to one SSB position being set, and two SSB positions are set in each slot.

For example, in the case of the sub-carrier space being 480 kHz, the terminal device, according to the SSB time index of 2, may determine that the target SSB is an SSB at the third SSB position in the half radio frame. The range of the OFDM symbol index value is {16, 21, 26, 31, 36, 41, 46, 51}+112n, that is, the index value of the OFDM symbol, relative to the starting point of the half radio frame, of the target SSB is 26.

In another scenario, the terminal device receiving the target SSB has searched an initial cell and accesses the network device. The network device may indicate the actual transmission position by sending the high-layer parameter. The maximum number of the SSBs for one SSB burst set in each frequency range is specified in the NR protocol. In actual system deployment, a network may configure the positions and the number of the actually transmitted SSBs in the SSB burst set in each cell according to the size of a coverage area and an angle range covered by each SSB beam. That is, the number of the actually transmitted SSBs in one SSB burst set may be smaller than or equal to the maximum number specified in the protocol. Untransmitted SSB resources may be used for transmission of a PDSCH and the like. As a possible implementation method, the network device notifies the terminal device of the actual transmission positions, including the positions and the number of the SSBs, by virtue of the high-layer parameter such as ssb-PositionsInBurst, which makes the terminal device correctly perform rate matching when receiving the PDSCH.

In the embodiments of the present disclosure, the actual transmission position of the target SSB is determined according to the various SSB positions being set in the half radio frame, which the various SSB positions being set in the half radio frame are spaced from each other by at least one OFDM symbol, and at least one slot in the half radio frame includes two SSB positions. The various SSB positions being set in the half radio frame are configured for a work band larger than 52.6 GHz, capable of being applied to SSB transmission in a scenario with a larger sub-carrier space.

In order to implement the foregoing embodiments, the present disclosure further provides a communication device.

The communication device provided in the embodiment of the present disclosure includes a processor, a transceiver, a memory, and an executable program stored on the memory and executable by the processor. When the processor runs the executable program, the foregoing methods are performed.

The communication device may be the foregoing base station or terminal.

The processor may include various types of storage mediums, and the storage medium is a non-transitory computer storage medium and can continue to memorize the information stored in the storage medium after the communication device is powered down. The communication device here includes a base station or a terminal.

The processor may be connected to the memory by a bus and the like, and is used to read the executable program stored on the memory, for example, as shown in at least one of FIGS. 1-4.

In order to implement the foregoing embodiments, the present disclosure further provides a computer storage medium.

The computer storage medium provided in the embodiment of the present disclosure stores an executable program, and after being executed by a processor, the foregoing methods are implemented, for example, as shown in at least one of FIGS. 1-4.

Figure 7:
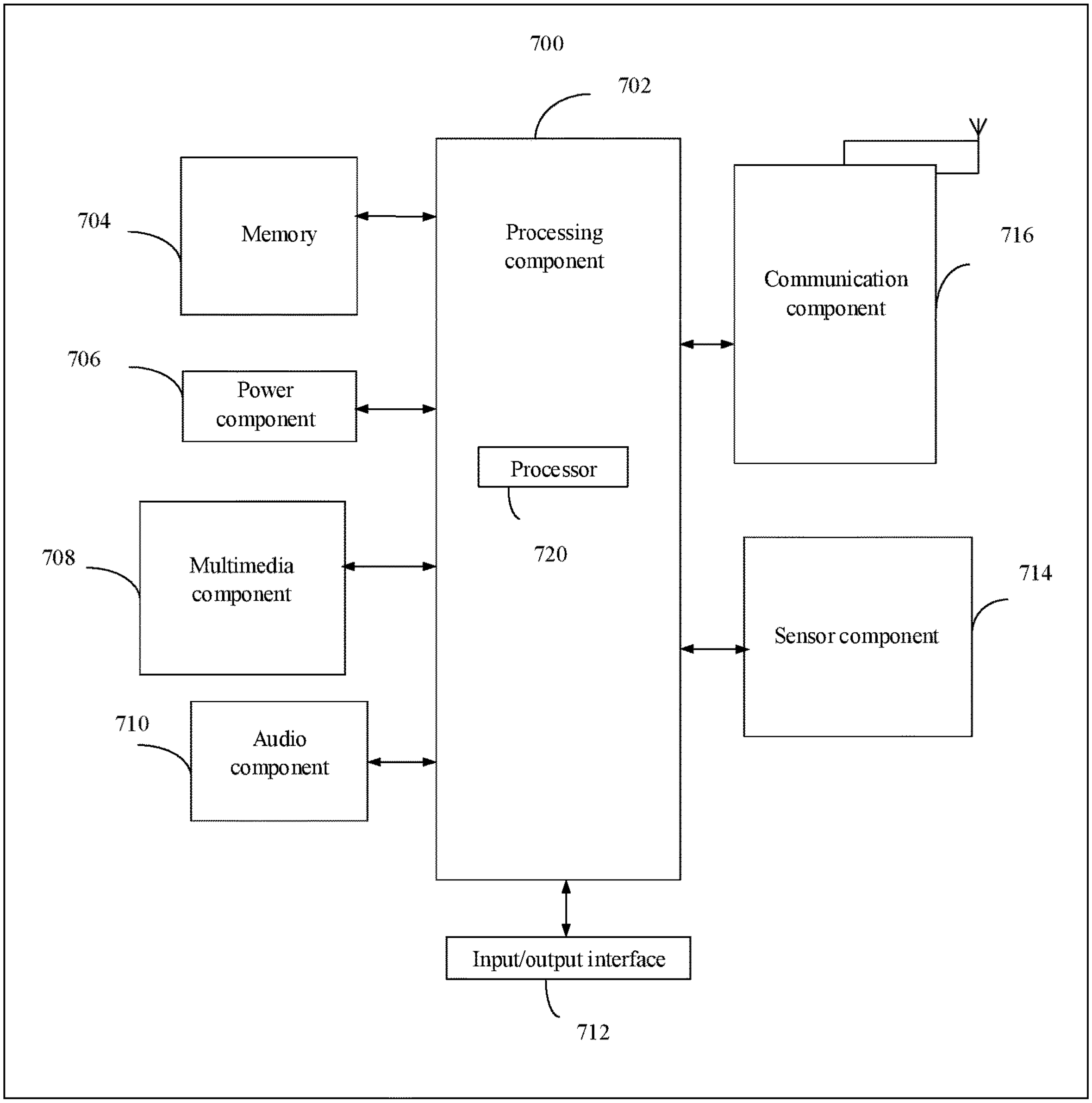
FIG. 7 is a block diagram of a terminal device provided by an embodiment of the present disclosure.

FIG. 7 is a block diagram of a terminal device provided by an embodiment of the present disclosure. The terminal device 700, for example, may be a mobile phone, a computer, digital broadcasting user equipment, a messaging device, a game console, a tablet device, a medical device, a fitness device, a personal digital assistant, and the like.

Referring to FIG. 7, the terminal device 700 may include at least one of the following components: a second processing component 702, a second memory 704, a second power component 706, a multimedia component 708, an audio component 710, a second input/output (I/O) interface 712, a sensor component 714, and a communication component 716.

The second processing component 702 generally controls an overall operation of the terminal device 700, such as operations associated with display, a telephone call, a data communication, a camera operation, and a recording operation. The second processing component 702 may include at least one second processor 720 to execute instructions to complete all or part of the steps of the foregoing methods. In addition, the second processing component 702 may include at least one module to facilitate interaction between the second processing component 702 and other components. For example, the second processing component 702 may include a multimedia module to facilitate interaction between the multimedia component 708 and the second processing component 702, performing any of the above methods applied to the base station, for example, as shown in FIGS. 1-2.

The second memory 704 is configured to store various types of data to support the operations at the terminal device 700. Examples of these data include instructions for any application or method operated on the terminal device 700, contact data, phone book data, messages, pictures, videos, and the like. The second memory 704 may be implemented by any type of volatile or non-volatile storage device or a combination, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk, or an optical disk.

The second power component 706 provides power to various components of the terminal device 700. The second power component 706 may include a power management system, at least one power source, and other components associated with power generation, management and distribution of the terminal device 700.

The multimedia component 708 includes a screen for providing an output interface between the terminal device 700 and a user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, slides, and gestures on the touch panel. The touch sensor may sense not only the boundary of the touch or slide, but also the wake-up time and pressure associated with the touch or slide. In some embodiments, the multimedia component 708 includes a front camera and/or a rear camera. When the terminal device 700 is in an operation mode, such as a shooting mode or a video mode, a front camera and/or a rear camera may receive external multimedia data. Each front or rear camera may be a fixed optical lens system or have a focal length and optical zoom capability.

The audio component 710 is configured to output and/or input an audio signal. For example, the audio component 710 includes a microphone (MIC), which is configured to receive external audio signals when the terminal device 700 is in an operation mode, such as a call mode, a recording mode, and a voice recognition mode. The received audio signal may be further stored on the second memory 704 or sent by the communication component 716. In some embodiments, the audio component 710 further includes a speaker for outputting the audio signal.

The second input/output interface 712 provides an interface between the processing component 702 and a peripheral interface module. The peripheral interface module may be a keyboard, a click wheel, buttons, etc. These buttons may include, but are not limited to, a home button, a volume button, a start button, and a lock button.

The sensor component 714 includes at least one sensor for providing various aspects of status assessment for the terminal device 700. For example, the sensor component 714 may detect an on/off state of the terminal device 700, and relative positioning of components, for example, the components are a display and a keypad of the terminal device 700. The sensor component 714 may further detect a change of position of the terminal device 700 or one component of the terminal device 700, whether or not the user touches the terminal device 700, an orientation or acceleration/deceleration of the terminal device 700, and a temperature variation of the terminal device 700. The sensor component 714 may include a proximity sensor configured to detect the presence of nearby objects without any physical contact. The sensor component 714 may further include an optical sensor, such as a CMOS or CCD image sensor, for use in imaging applications. In some embodiments, the sensor component 714 may further include an acceleration sensor, a gyroscope sensor, a magnetic sensor, a pressure sensor, or a temperature sensor.

The communication component 716 is configured to facilitate wired or wireless communication between the terminal device 700 and other devices. The terminal device 700 may access a wireless network based on communication standards, such as WiFi, 2G, or 3G, or a combination. In an example, the communication component 716 receives broadcast signals or broadcast-associated information from an external broadcast management system through a broadcast channel. In an example, the communication component 716 further includes a near field communication (NFC) module to facilitate short-range communication. For example, the NFC module may be implemented based on the radio frequency identification (RFID) technology, the infrared data association (IrDA) technology, the ultra wide band (UWB) technology, the Bluetooth (BT) technology, and other technologies.

In an example, the terminal device 700 may be implemented by at least one application-specific integrated circuit (ASIC), digital signal processor (DSP), digital signal processing device (DSPD), programmable logic device (PLD), field programmable gate array (FPGA), controller, microcontroller, microprocessor or other electronic components to perform the above methods.

In an example, a non-transitory computer-readable storage medium including instructions is further provided, such as the second memory 704 including the instructions executable by the second processor 720 of the terminal device 700 to complete the above methods. For example, the non-transitory computer-readable storage medium may be a ROM, a random access memory (RAM), a CD-ROM, a magnetic tape, a floppy disk, an optical data storage device, etc.

Figure 8:
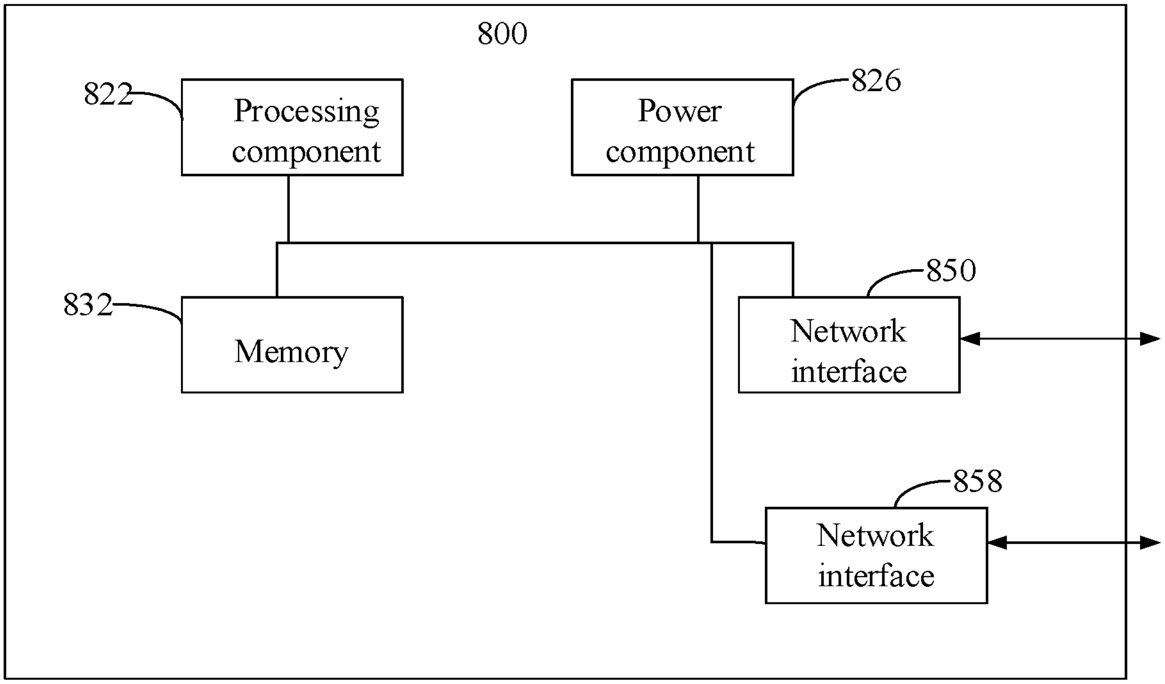
FIG. 8 is a schematic structural diagram of a network device provided by an embodiment of the present disclosure.

As shown in FIG. 8, it is a schematic structural diagram of a network device provided by an embodiment of the present disclosure. For example, a network device 800 may be provided as a network device. Referring to FIG. 8, the network device 800 includes a first processing component 822, and further includes at least one first processor, and a memory resource represented by the first memory 832, used to store instructions that may be executed by the first processing component 822, such as applications. The applications stored on the first memory 832 may include one or more modules, each corresponding to a set of instructions. In addition, the first processing component 822 is configured to execute instructions, to execute any methods applied to the base station of the above methods, such as the methods shown in FIGS. 3 to 4.

The network device 800 may further include a first power component 826 configured to execute power supply management of the network device 800, a wired or wireless network interface 850 configured to connect the network device 800 to a network, and a first input/output (I/O) interface 858. The network device 800 may operate an operating system stored on the first memory 832, such as Windows Server™, Mac OS X™, Unix™, Linux™, FreeBSD™ or the like.

Those skilled in the art would readily conceive of other implementations of the present disclosure after considering the specification and practicing the present disclosure disclosed here. The present disclosure is intended to cover any variations, uses, or adaptive changes of the present disclosure. These variations, uses, or adaptive changes follow the general principle of the present disclosure and include common general knowledge or conventional technical means in the technical field that are not disclosed in the present disclosure.

It should be understood that the present disclosure is not limited to the precise structure described above and shown in the drawings, and various modifications and changes can be made without departing from its scope. The scope of the present disclosure is limited by the appended claims.

An embodiment in a first aspect of the present disclosure provides a determination method for an SRS position, the determination method performed by a network device, the method including:

determining an actual transmission position of a target SSB according to various SSB positions being set in a radio frame; and sending indication information of the actual transmission position to a terminal device, which the various SSB positions being set in the radio frame are spaced from each other by at least one OFDM symbol, and at least one slot in the radio frame includes two SSB positions.

Optionally, in a licensed band, a total number of the SSB positions set in the radio frame is m times of L, where m is a natural number not equal to 0; and L is a maximum number of SSBs included in an SSB burst set.

Optionally, in an unlicensed band, an alternative SSB position, which is configured for SSB transmission in the unlicensed band, is set in the radio frame.

Optionally, at least one of the SSB positions and the OFDM symbol adjacent thereto in the radio frame corresponds to one beam; and the adjacent OFDM symbol is configured for uplink transmission.

Optionally, the target SSB and a corresponding control-resource set CORESET0 are synchronously carried on different sub-carrier frequencies.

Optionally, the actual transmission position is a part of the various SSB positions being set.

Optionally, the indication information of the actual transmission position includes: at least one of a high-layer parameter and an SSB time index.

Optionally, in response to a sub-carrier space being 480 kHz, a range of an OFDM symbol index value in the radio frame for a first OFDM symbol occupied by each SSB position is {16, 21, 26, 31, 36, 41, 46, 51}+112n, wherein n takes a value of 0 or 1.

Optionally, in response to the sub-carrier space being 960 kHz, a range of the OFDM symbol index value in the radio frame for the first OFDM symbol occupied by each SSB position is {16, 21, 26, 31, 36, 41, 46, 51, 56, 61, 66, 71, 76, 81, 86, 91}+112n, wherein n takes a value of 0 or 1.

An embodiment in a second aspect of the present disclosure provides a determination method for an SRS position, the determination method performed by a terminal device, the method including:

- determining an actual transmission position of an actually transmitted target SSB in the radio frame according to position indication information sent by the network device and various SSB positions being set in a radio frame,
- which the various SSB positions being set in the radio frame are spaced from each other by at least one OFDM symbol, and at least one slot in the radio frame includes two SSB positions.

Optionally, in a licensed band, a total number of the SSB positions being set in the radio frame is m times L, where m is a natural number not equal to 0, and L is a maximum number of SSBs included in an SSB burst set.

Optionally, in an unlicensed band, an alternative SSB position, which is configured for SSB transmission in the unlicensed band, is set in the radio frame.

Optionally, at least one of the SSB positions and the OFDM symbol adjacent thereto in the radio frame corresponds to one beam; and the adjacent OFDM symbol is configured for uplink transmission.

Optionally, the target SSB and a corresponding control-resource set CORESET0 are synchronously carried on different sub-carrier frequencies.

Optionally, the position where the target SSB is actually transmitted is a part of the various SSB positions being set.

Optionally, the position indication information includes: at least one of a high-layer parameter and an SSB time index.

Optionally, in response to a sub-carrier space being 480 kHz, a range of an OFDM symbol index value in the radio frame for a first OFDM symbol occupied by each SSB position is {16, 21, 26, 31, 36, 41, 46, 51}+112n, wherein n takes a value of 0 or 1.

Optionally, in response to the sub-carrier space being 960 kHz, a range of the OFDM symbol index value in the radio frame for the first OFDM symbol occupied by each SSB position is {16, 21, 26, 31, 36, 41, 46, 51, 56, 61, 66, 71, 76, 81, 86, 91}+112n, wherein n takes a value of 0 or 1.

An embodiment in a third aspect of the present disclosure provides a determination apparatus for an SRS position, the determination apparatus performed by a network device, the apparatus including:

- a determining module, configured to determine an actual transmission position of a target SSB according to various SSB positions being set in a radio frame; and
- a sending module, configured to send indication information of the actual transmission position to a terminal device,
- which the various SSB positions being set in the radio frame are spaced from each other by at least one OFDM symbol, and at least one slot in the radio frame includes two SSB positions.

An embodiment in a fourth aspect of the present disclosure provides a determination apparatus for an SRS position, the determination apparatus performed by a terminal device, the apparatus including:

- a determining module, configured to determine an actual transmission position of an actually transmitted target SSB in the radio frame according to position indication information sent by the network device and various SSB positions being set in a radio frame,
- which the various SSB positions being set in the radio frame are spaced from each other by at least one OFDM symbol, and at least one slot in the radio frame includes two SSB positions.

An embodiment in a fifth aspect of the present disclosure provides a communication device is provided, including: a transceiver, a memory, and a processor which is connected to the transceiver and the memory respectively, is configured to control radio signal transceiving of the transceiver and implement the method provided in the first aspect or the second aspect is implemented by executing computer-executable instructions on the memory.

An embodiment in a sixth aspect of the present disclosure provides a computer storage medium storing computer-executable instructions is provided, which, after the computer-executable instructions are executed by a processor, the method provided in the first aspect or the second aspect is implemented.

What is claimed is:

1. A determination method for an SSB position, performed by a network device, the method comprising:

- determining an actual transmission position of a target SSB according to various SSB positions being set in a radio frame; and
- sending indication information of the actual transmission position to a terminal device;
- wherein the various SSB positions being set in the radio frame are spaced from each other by at least one OFDM symbol, and at least one slot in the radio frame comprises two SSB positions;
- wherein in a case where a sub-carrier space is 480 kHz, a range of an OFDM symbol index value in the radio frame for a first OFDM symbol occupied by an SSB position is {16, 21, 26, 31, 36, 41, 46, 51}+112n, wherein n takes a value of 0 or 1; or in a case where the sub-carrier space is 960 kHz, a range of the OFDM symbol index value in the radio frame for the first OFDM symbol occupied by an SSB position is {16, 21, 26, 31, 36, 41, 46, 51, 56, 61, 66, 71, 76, 81, 86, 91}+112n, wherein n takes a value of 0 or 1.

2. The determination method according to claim 1, wherein

- in an unlicensed band, an alternative SSB position, which is configured for SSB transmission in the unlicensed band, is set in the radio frame.

3. The determination method according to claim 2, wherein

- at least one of the SSB positions and the OFDM symbol adjacent thereto in the radio frame correspond to one beam; and the adjacent OFDM symbol is configured for uplink transmission.

4. The determination method according to claim 1, wherein

- in a licensed band, a total number of the SSB positions being set in the radio frame is m times of L, wherein m is a natural number not equal to 0; and L is a maximum number of SSBs comprised in an SSB burst set.

5. The determination method according to claim 1, wherein the target SSB and a corresponding control-resource set CORESET0 are synchronously carried on different sub-carrier frequencies.

6. The determination method according to claim 1, wherein the actual transmission position is a part of the various SSB positions being set.

7. The determination method according to claim 1, wherein the indication information of the actual transmission position comprises: at least one of a high-layer parameter and an SSB time index.

8. The determination method according to claim 1, wherein the target SSB is a cell-defined SSB having a sub-carrier space smaller than or equal to 240 kHz, or a cell-defined SSB having the sub-carrier space larger than 240 kHz, or a non-cell-defined SSB.

9. A determination method for an SSB position, performed by a terminal device, the method comprising:

determining an actual transmission position of an actually transmitted target SSB in a radio frame according to position indication information sent by a network device and various SSB positions being set in the radio frame;

wherein the various SSB positions being set in the radio frame are spaced from each other by at least one OFDM symbol, and at least one slot in the radio frame comprises two SSB positions;

wherein in a case where a sub-carrier space is 480 kHz, a range of an OFDM symbol index value in the radio frame for a first OFDM symbol occupied by an SSB position is {16, 21, 26, 31, 36, 41, 46, 51}+112n, wherein n takes a value of 0 or 1; or in a case where the sub-carrier space is 960 kHz, a range of the OFDM symbol index value in the radio frame for the first OFDM symbol occupied by an SSB position is {16, 21, 26, 31, 36, 41, 46, 51, 56, 61, 66, 71, 76, 81, 86, 91}+112n, wherein n takes a value of 0 or 1.

10. The determination method according to claim 9, wherein in an unlicensed band, an alternative SSB position, which is configured for SSB transmission in the unlicensed band, is set in the radio frame.

11. The determination method according to claim 10, wherein at least one of the SSB positions and the OFDM symbol adjacent thereto in the radio frame correspond to one beam; and the adjacent OFDM symbol is configured for uplink transmission.

12. The determination method according to claim 9, wherein in a licensed band, a total number of the SSB positions being set in the radio frame is m times of L, wherein m is a natural number not equal to 0; and L is a maximum number of SSBs comprised in an SSB burst set.

13. The determination method according to claim 9, wherein the target SSB and a corresponding control-resource set CORESET0 are synchronously carried on different sub-carrier frequencies.

14. The determination method according to claim 9, wherein the position where the target SSB is actually transmitted is a part of the various SSB positions being set.

15. The determination method according to claim 9, wherein the position indication information comprises: at least one of a high-layer parameter and an SSB time index.

16. The determination method according to claim 9, wherein the target SSB is a cell-defined SSB having a sub-carrier space smaller than or equal to 240 kHz, or a cell-defined SSB having the sub-carrier space larger than 240 kHz, or a non-cell-defined SSB.

17. A terminal device, comprising:

a transceiver;

a memory; and a processor which is communicatively connected to the transceiver and the memory respectively;

wherein the processor is configured to control radio signal transceiving of the transceiver and implement the method according to claim 9 by executing computer-executable instructions on the memory.

18. A network device, comprising:

a transceiver;

a memory; and a processor which is communicatively connected to the transceiver and the memory respectively;

wherein the processor is configured to control radio signal transceiving of the transceiver and implement:

determine an actual transmission position of a target SSB according to various being SSB positions being set in a radio frame; and send indication information of the actual transmission position to a terminal device;

wherein the various SSB positions being set in the radio frame are spaced from each other by at least one OFDM symbol, and at least one slot in the radio frame comprises two SSB positions;

wherein in a case where a sub-carrier space is 480 kHz, a range of an OFDM symbol index value in the radio frame for a first OFDM symbol occupied by an SSB position is {16, 21, 26, 31, 36, 41, 46, 51}+112n, wherein n takes a value of 0 or 1; or in a case where the sub-carrier space is 960 kHz, a range of the OFDM symbol index value in the radio frame for the first OFDM symbol occupied by an SSB position is {16, 21, 26, 31, 36, 41, 46, 51, 56, 61, 66, 71, 76, 81, 86, 91}+112n, wherein n takes a value of 0 or 1.

* * * * *